(12) United States Patent
Ding et al.

(10) Patent No.: US 12,233,921 B2
(45) Date of Patent: Feb. 25, 2025

(54) RAIL TRAIN

(71) Applicant: CRRC TANGSHAN CO., LTD., Tangshan (CN)

(72) Inventors: Liqing Ding, Tangshan (CN); Li Xiong, Tangshan (CN); Guoyan Gao, Tangshan (CN); Huanying Jia, Tangshan (CN); Shuai Yang, Tangshan (CN); Liwei Shen, Tangshan (CN); Juanjuan Wu, Tangshan (CN); Haichao Lu, Tangshan (CN); Fanshuai Meng, Tangshan (CN); Guopeng Hu, Tangshan (CN); Xuling Gao, Tangshan (CN); Chen Liu, Tangshan (CN)

(73) Assignee: CRRC TANGSHAN CO., LTD., Tangshan (CN)

( * ) Notice: Subject to any disclaimer, the term of this patent is extended or adjusted under 35 U.S.C. 154(b) by 792 days.

(21) Appl. No.: 17/478,976

(22) Filed: Sep. 20, 2021

(65) Prior Publication Data
US 2022/0001903 A1   Jan. 6, 2022

Related U.S. Application Data

(63) Continuation of application No. PCT/CN2019/090853, filed on Jun. 12, 2019.

(51) Int. Cl.
*B61D 17/12* (2006.01)
*B61D 17/18* (2006.01)

(52) U.S. Cl.
CPC ............. *B61D 17/12* (2013.01); *B61D 17/18* (2013.01)

(58) Field of Classification Search
CPC ........ B61D 17/12; B61D 17/18; B61D 17/14; B61D 27/00
See application file for complete search history.

(56) References Cited

U.S. PATENT DOCUMENTS

| 4,574,336 | A | * | 3/1986 | Mikalonis | ................ B60Q 3/43 362/151 |
| 5,063,859 | A | * | 11/1991 | Rader | ...................... B61D 1/06 105/340 |
| 5,441,326 | A | * | 8/1995 | Mikalonis | ................ B60Q 3/44 105/325 |
| 2017/0174055 | A1 | * | 6/2017 | Demange | ................. B60J 5/042 |

FOREIGN PATENT DOCUMENTS

| CN | 107310566 A | * | 11/2017 | ............. B61D 17/14 |
| CN | 208604425 U |  | 3/2019 | |
| CN | 110654404 A |  | 1/2020 | |
| CN | 111547111 A |  | 8/2020 | |
| WO | WO-2013125250 A1 | * | 8/2013 | ........... B61D 17/005 |

* cited by examiner

*Primary Examiner* — Zachary L Kuhfuss
(74) *Attorney, Agent, or Firm* — Nitin Kaushik

(57) ABSTRACT

A rail train is provided in the embodiment of the present disclosure, comprising: a semi-enclosed air duct, the semi-enclosed air duct comprises an air duct top and an air duct side; the air duct top is fixed with an inner top of a rail train body, the air duct side is connected on both sides of the air duct top and extends downward; a large side top, and the the large side top is fixed to the rail train body as a part of a rail train roof, and the large side top is top-sealed at a bottom of the air duct side to form an air passage with the air duct. The rail train solves the technical problem that the roof and the air duct of the rail train are not conducive to overall weight reduction of the rail train.

18 Claims, 13 Drawing Sheets

RAIL TRAIN

CROSS-REFERENCE TO RELATED DISCLOSURES

The disclosure claims priority to Chinese patent disclosure No. 201910286098.4, filed on Apr. 10, 2019, the entire contents of which are incorporated herein by reference.

TECHNICAL FIELD

The present disclosure relates to the technical field of electric locomotives, in particular to a rail train.

BACKGROUND

The roof and air duct of the rail train are designed separately and have large weight, which is not conducive to the overall weight reduction of the rail train.

Therefore, the roof and the air duct of the rail train are not conducive to the overall weight reduction of the rail train, which is a technical problem urgently to be solved by those skilled in the art.

The above-described information disclosed in the background art is only intended to enhance understanding of the background of the present disclosure and may therefore contain information that is not known to those of ordinary skill in the art.

SUMMARY

The embodiment of the present disclosure provides a rail train, so as to solve the technical problem that the roof and the air duct of the rail train are not conducive to the overall weight reduction of the rail train.

The embodiment of the present disclosure provides a rail train, comprising:

a semi-enclosed air duct, and the semi-enclosed air duct comprises an air duct top and an air duct side; the air duct top is fixed with an inner top of a rail train body, the air duct side is connected on both sides of the air duct top and extends downward; and a large side top, and the large side top is fixed to the rail train body as a part of a rail train roof, and the large side top is top-sealed at a bottom of the air duct side to form an air passage with the air duct.

The embodiment of the present disclosure has the following technical effects due to the adoption of the above technical solution:

the semi-enclosed air duct comprises an air duct top and an air duct side; the air duct top is fixed with an inner top of a rail train body, the air duct side is connected on both sides of the air duct top and extends downward; and the large side top is fixed to the rail train body as a part of a rail train roof, and the large side top is top-sealed at a bottom of the air duct side to form an air passage with the air duct.

In this way, the large side top acts not only as part of the rail train roof, but also as the bottom of the air passage. Compared with the rail train in the background art, a component can be reduced. Therefore, the component of the large side top of the rail train according to the embodiment of the present disclosure plays two roles, one role is conducive to the overall weight reduction of the rail train, and the other role conforms to the development direction of energy conservation and emission reduction of the rail train.

BRIEF DESCRIPTION OF DRAWINGS

The drawings illustrated herein are intended to provide a further understanding of the present disclosure and form part of the present disclosure, and the illustrative embodiment of the present disclosure and the description thereof are intended to explain the present disclosure and do not constitute undue limitation to the present disclosure. In the attached drawings.

DETAILED DESCRIPTION OF THE EMBODIMENTS

In order to make the technical solution and advantages in the embodiment of the present disclosure more clear, the exemplary embodiment of the present disclosure are described in further detail below in combination with the drawings, and it is obvious that the described embodiment are only part of the embodiments of the present disclosure and not exhaustive of all the embodiments. It should be noted that the embodiment and the feature in the embodiment of the present disclosure can be combined with each other without conflict.

Embodiment 1

Figure 1:
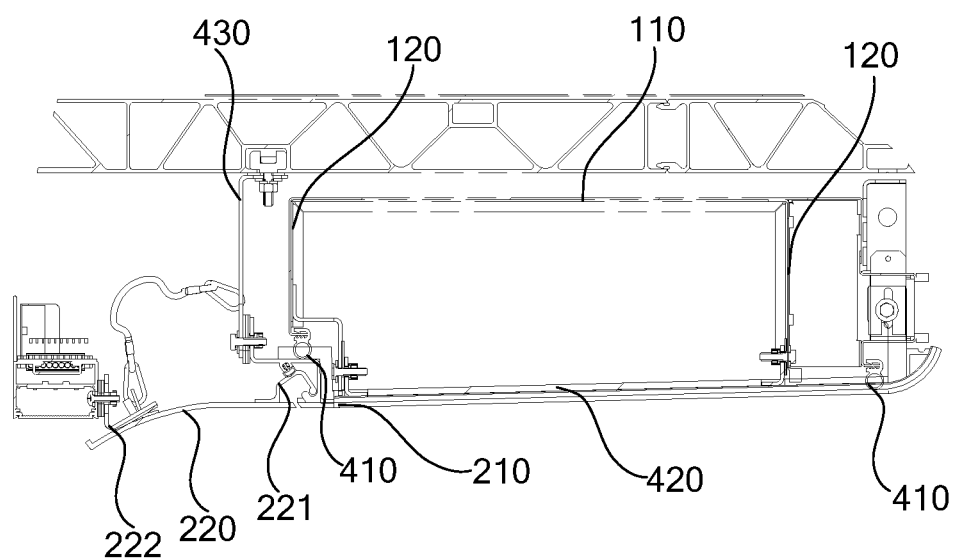
FIG. 1 illustrates a partial schematic diagram of the top of a lower layer carriage of a rail train according to the embodiment of the present disclosure.
Figure 2:
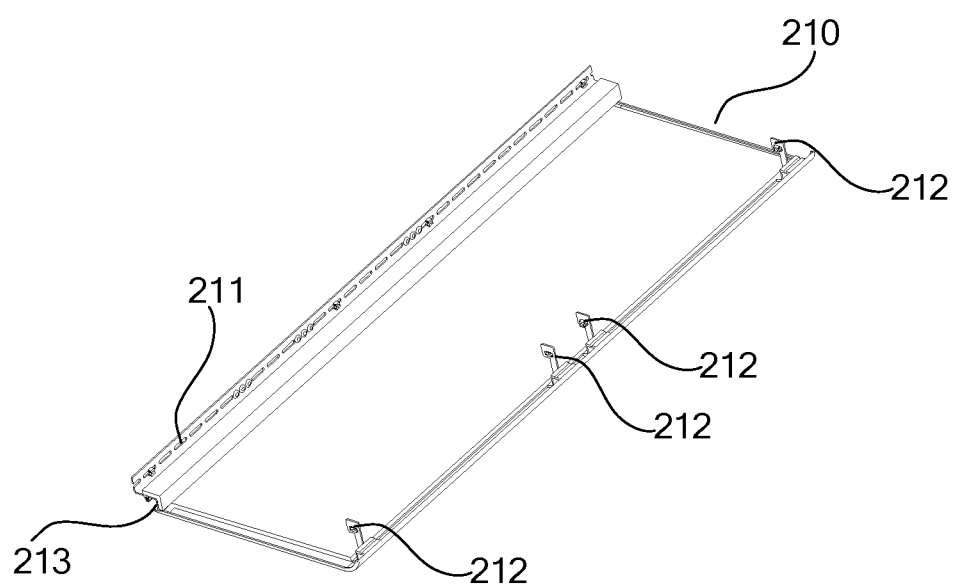
FIG. 2 illustrates a schematic diagram of a lower large side top of the rail train shown in the FIG. 1.
Figure 3:
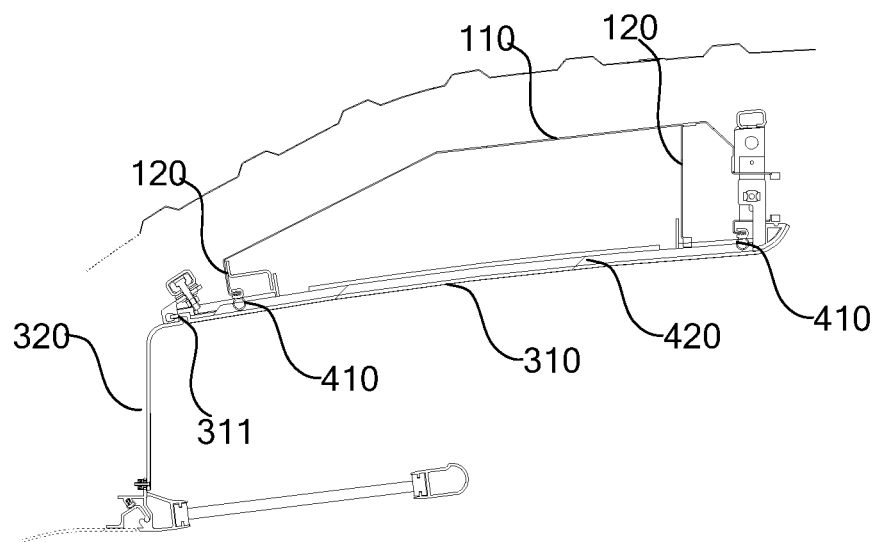
FIG. 3 illustrates a partial schematic diagram of the top of an upper layer carriage of the rail train according to the embodiment of the present disclosure.
Figure 4:
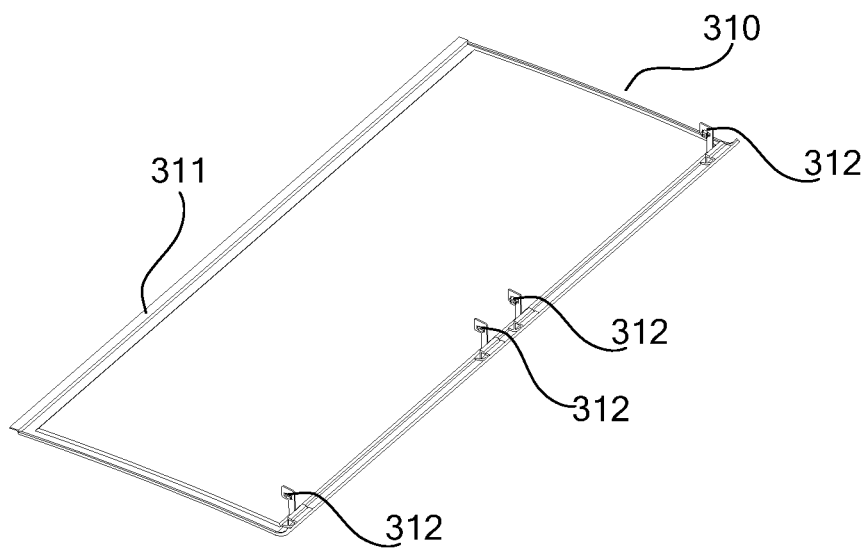
FIG. 4 illustrates a schematic diagram of an upper large side top of the rail train shown in the FIG. 3.

FIG. 1 illustrates a partial schematic diagram of the top of a lower layer carriage of a rail train according to the embodiment of the present disclosure; FIG. 2 illustrates a schematic diagram of a lower large side top of the rail train; FIG. 3 illustrates a partial schematic diagram of the top of an upper layer carriage of the rail train according to the embodiment of the present disclosure; FIG. 4 illustrates a schematic diagram of an upper large side top of the rail train shown in the FIG. 3. As shown in FIG. 1, FIG. 2, and FIG. 3 and FIG. 4, the rail train according to an embodiment of the present disclosure comprises:

a semi-enclosed air duct, and the semi-enclosed air duct comprises an air duct top 110 and an air duct side 120; the air duct top 110 is fixed with an inner top of a rail train body, the air duct side 120 is connected on both sides of the air duct top and extends downward; and a large side top, the large side top is fixed to the rail train body as a part of a rail train roof, and the large side top is top-sealed at a bottom of the air duct side to form an air passage with the air duct, wherein: the large side top comprises a lower large side top 210 and an upper large side top 310.

The rail train in the present embodiment of the present disclosure comprises a semi-enclosed air duct, and a large side top; wherein: the semi-enclosed air duct comprises an air duct top and an air duct side; the air duct top is fixed with an inner top of a rail train body, the air duct side is connected on both sides of the air duct top and extends downward; and the large side top is fixed to the rail train body as a part of a rail train roof, and the large side top is top-sealed at a bottom of the air duct side to form an air passage with the air duct. In this way, the large side top acts not only as part of the rail train roof, but also as the bottom of the air passage. Compared with the rail train in the background art, a component can be reduced. Therefore, the component of the large side top of the rail train according to the embodiment of the present disclosure plays two roles, one role is conducive to the overall weight reduction of the rail train, and the other role conforms to the development direction of energy conservation and emission reduction of the rail train.

Figure 5:
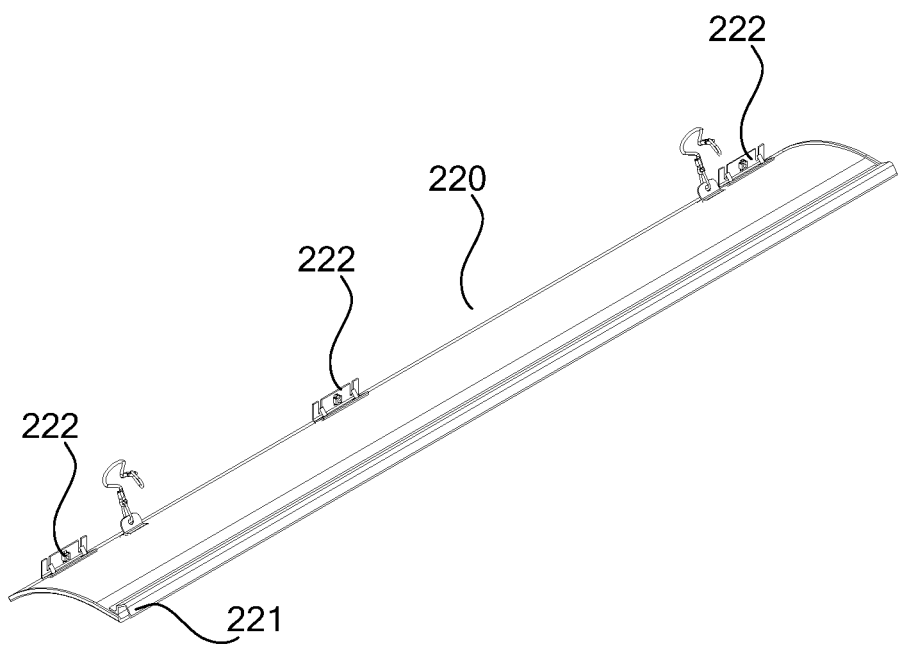
FIG. 5 illustrates a schematic diagram of a lower small side top of the rail train shown in the FIG. 1.
Figure 6:
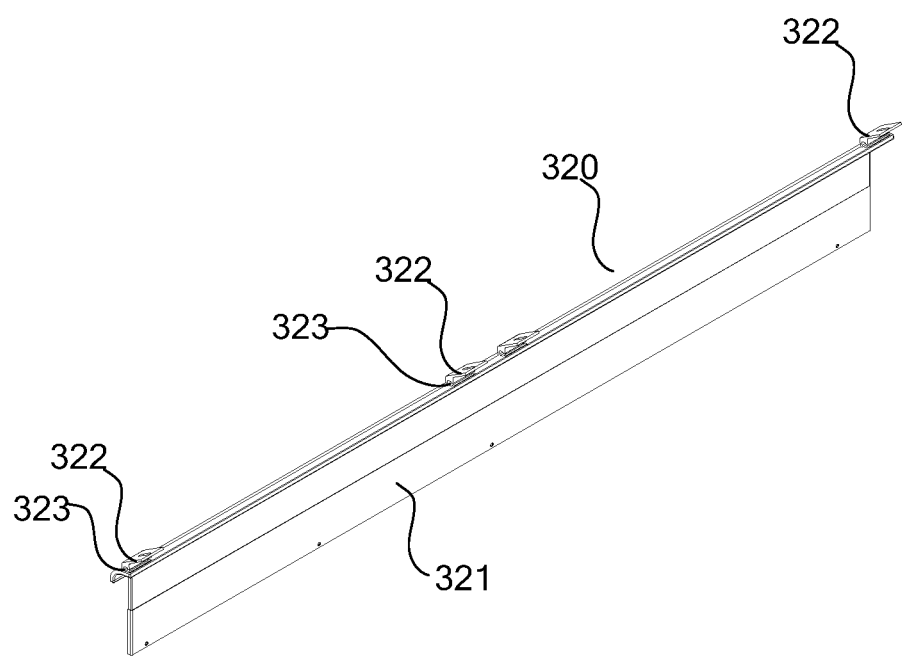
FIG. 6 illustrates a schematic diagram of an upper small side top of the rail train shown in the FIG. 3.

FIG. 5 illustrates a schematic diagram of a lower small side top of the rail train shown in the FIG. 1; FIG. 6 illustrates a schematic diagram of an upper small side top of the rail train shown in the FIG. 3. In the implementation, as shown in the FIG. 5 and FIG. 6, the rail train further comprises:
  a small side top, and the small side top is fixed between the large side top and a side of the rail train as the part of the rail train roof, wherein: the small side top comprises a lower small side top 220 and an upper small side top 320.

The portion between the air duct in the rail train roof and the side of the rail train is borne by the small side top.

Figure 7:
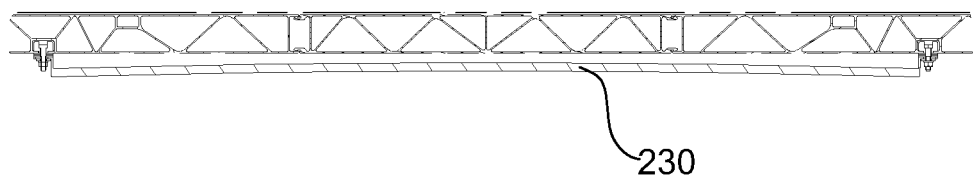
FIG. 7 illustrates another partial schematic diagram of the top of a lower layer carriage of the rail train according to the embodiment of the present disclosure.
Figure 8:
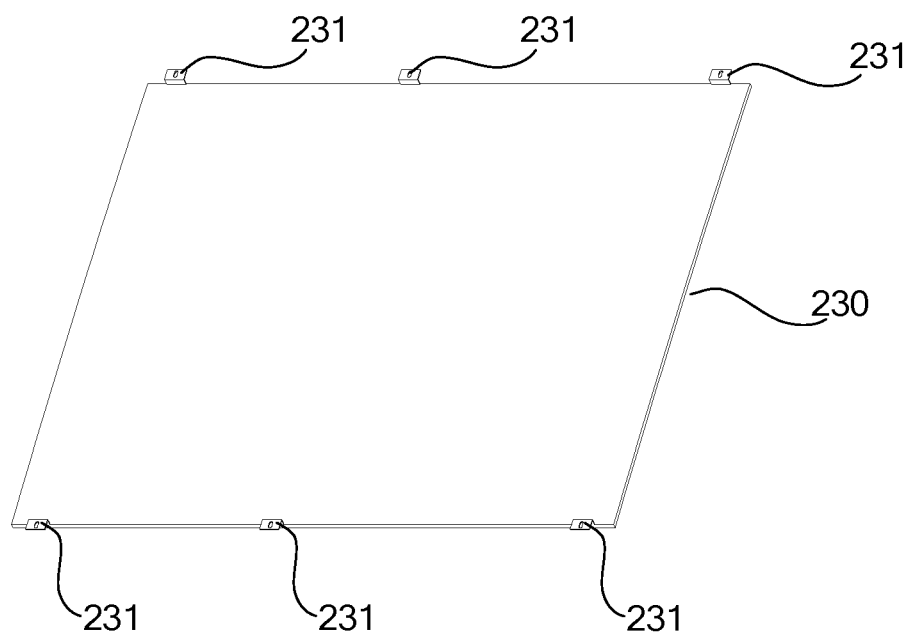
FIG. 8 illustrates a schematic diagram of the lower middle roof of the rail train shown in the FIG. 7.
Figure 9:
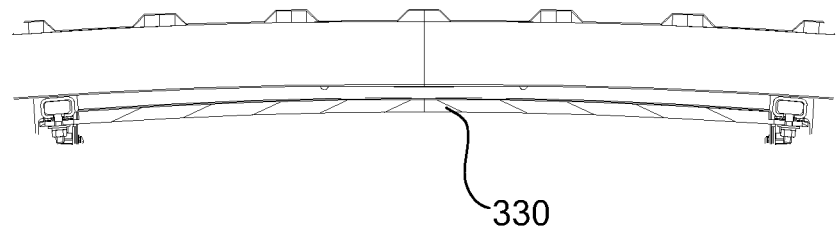
FIG. 9 illustrates another partial schematic diagram of the top of an upper layer carriage of the rail train according to the embodiment of the present disclosure.
Figure 10:
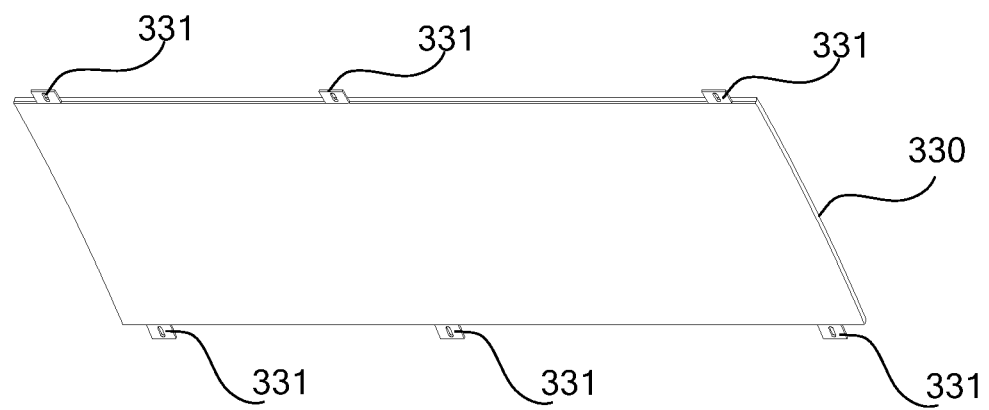
FIG. 10 illustrates a schematic diagram of an upper middle roof of the rail train shown in the FIG. 9.

FIG. 7 illustrates another partial schematic diagram of the top of a lower layer carriage of the rail train according to the embodiment of the present disclosure; FIG. 8 illustrates a schematic diagram of the lower middle roof of the rail train shown in the FIG. 7; FIG. 9 illustrates another partial schematic diagram of the top of an upper layer carriage of the rail train according to the embodiment of the present disclosure; FIG. 10 illustrates a schematic diagram of an upper middle roof of the rail train shown in the FIG. 9. In the implementation, as shown in the FIG. 7, FIG. 8, FIG. 9 and FIG. 10, the rail train comprises a middle roof and the middle roof is fixed between a left air duct and a right air duct as a middle part of the rail train roof.

The left air duct and the right air duct are two air ducts of a carriage of the rail train, and the middle roof comprises a lower middle roof 230 and an upper middle roof 330.

The part between the left air duct and the right air duct in the rail train roof is borne by the middle roof.

Specifically, the large side top is a large side top made of 4 mm fiber glass-reinforced plastics, and the small side top is a small side top made of the 4 mm fiber glass-reinforced plastics.

In the implementation, the large side top comprises a left large side top and a right large side top, and the left large side top and the right large side top are two symmetrical structures, the left large side top is top-sealed at a bottom of a left air duct side, and the right large side top is top-sealed at a bottom of a right side of the air duct side; and
  the small side top comprises a left small side top and a right small side top, and the left small side top and the right small side top are the two symmetrical structures, the left small side top is fixed between the left large side top and a left side part of the rail train, and the right small side top is fixed between the right large side top and a right side part of the rail train.

In this way, the middle roof, the left large side top, the right large side top, the left small side top and the right small side top together serve as the roof of the whole rail train.

In the implementation, as shown in the FIG. 1 and FIG. 3, the rail train further comprising:
  a sealing strip 410, and the sealing strip 410 is fixed at the bottom of the air duct side 120; an interference fit is adopted between the sealing strip 410 and the large side top for a fixing connection.

In this way, the seal between the air duct side and the large side top is realized.

Specifically, the sealing strip 410 is made of the rubber strip.

In the implementation, as shown in the FIG. 1 and FIG. 3, the rail train further comprising:
  a cold-proof layer 420, and the cold-proof layer 420 is fixed on a side of the large side top toward the air duct.

On the one hand, the cold-proof layer can prevent condensation water from appearing above the large side top, and on the other hand, it can realize the sealing between the large side top and the air duct.

In the implementation, as shown in the FIG. 1, the rail train further comprises a L-shaped connecting angle code 430.

A first corner arm of the L-shaped connecting angle code 430 and an inner top of a lower layer rail train body are fixed, and a second corner arm of the L-shaped connecting angle code 430 and a side of a lower large side top 210 close to the lower layer rail train body are fixed, so as to top-seal the lower large side top 210 on a bottom of a side of a lower layer air duct.

The lower layer rail train body is a body of a lower layer carriage of a double-deck train, the lower large side top 210 is a large side top of the lower layer carriage of the double-deck train, the lower layer air duct is an air duct of the lower layer carriage of the double-deck train.

The connection angle code enables the fixing of the lower large side top and the lower layer rail train body so as to top-seal the lower large side top at the bottom of the side of the lower layer air duct.

In the implementation, a first mounting groove is arranged in an inner top of the lower layer rail train body; the first corner arm of the L-shaped connecting angle code 430 and the inner top of the lower layer rail train body are fixed by the first mounting groove, bolts and nuts.

A plurality of oblong holes 211 are provided along a length direction on a side of the lower large side top 210 close to a side of the rail train body; the second corner arm of the L-shaped connecting angle code 430 and the side of the lower large side top 210 close to the lower layer rail train body are fixed by the oblong holes 211, the bolts and the nuts.

In this way, the lower large side top 210 can be conveniently fixed to the lower layer rail train body.

Figure 12:
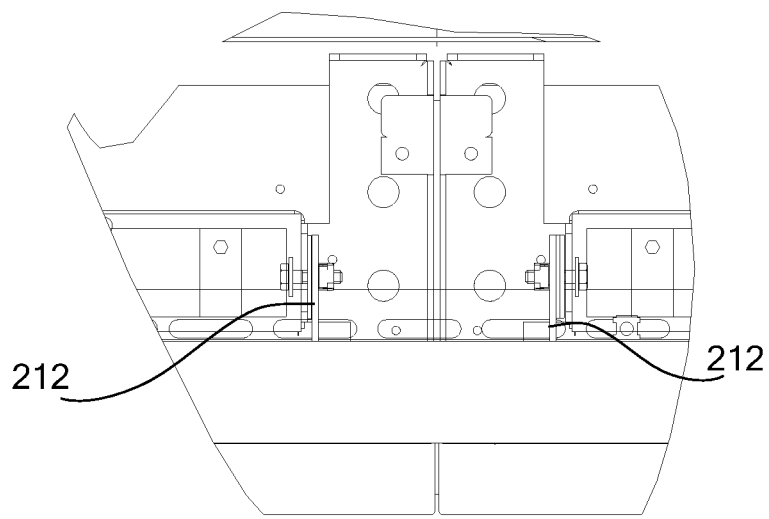
FIG. 12 and FIG. 13 are schematic diagrams of fixing the lower large side top and the lower layer air duct shown in the FIG. 2.
Figure 13:
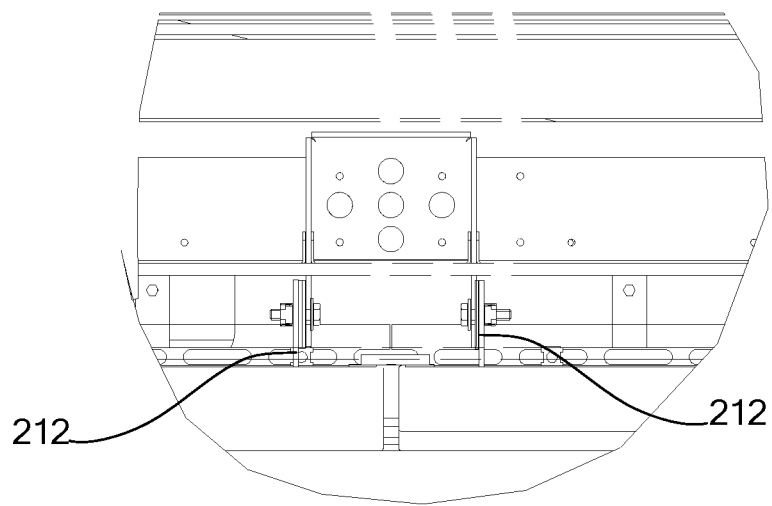

FIG. 12 and FIG. 13 are schematic diagrams of fixing the lower large side top and the lower layer air duct shown in the FIG. 2. In the implementation, as shown in the FIG. 2, FIG. 12 and FIG. 13, a plurality of first fixing protrusions 212 are provided along the length direction on the side of the lower large side top 210 close to a center line of the lower layer rail train body.

The first fixing protrusions 212 are fixed with the lower layer air duct.

In this way, the lower large side top and the lower layer air duct are fixed. The lower large side top is fixed with the lower layer rail train body and the lower layer air duct, realizing the fixing of the lower large side top.

In the implementation, as shown in the FIG. 5, a V-shaped fixing part 222 is fixed on an inner side of a lower small side top. An arm of the V-shaped fixing part 222 is fixed with the inner side of the lower small side top; an other arm of the V-shaped fixing part 222 is fixed with a lamp profile of a lower layer carriage of the rail train.

The lower small side top is a small side top of the lower layer carriage of the double-deck train.

In this way, the fixing of the lower small side top and the lamp profiles of the lower layer carriage of the rail train is realized.

In the implementation, as shown in the FIG. 1 and FIG. 5, an inner side of the lower small side top near the side of the lower large side top is provided with a buckle 221;
an inner side of the lower large side top 210 close to a side of the lower small side top is provided with a buckle groove 213;
the buckle 221 and the buckle groove 213 are engaged to connect the lower small side top 220 and the lower large side top 210.

The buckle and the buckle groove realize the fixed connection between the lower small side top and the lower large side top.

In the implementation, an inner edge of a lower middle roof 230 is provided with an upward convex bending part 231.

The inner top of the lower layer rail train body is provided with a second mounting groove, the lower middle roof and the inner top of the lower layer rail train body are fixed by the upward convex bending part, the second mounting groove, the bolts and the nuts.

The lower middle roof is a middle roof of the lower layer carriage of the double-deck train.

In this way, the lower middle roof and the inner top of the lower layer rail train body can be conveniently fixed.

In the implementation, as shown in the FIG. 3 and FIG. 6, an upper small side top 320 comprises a vertical part 321 and a fixing part 322 connected to an upper end of the vertical part, and a lower side of the vertical part 321 is fixed to a luggage rack of the rail train.

A third mounting groove is arranged in an inner top of an upper layer rail train body, the upper small side top 320 and the inner top of the upper layer rail train body are fixed by the fixing part 322, the third mounting groove, the bolts and the nuts.

The upper small side top 320 is a small side top of an upper layer carriage of the double-deck train, and the upper layer rail train body is a rail train body of the upper layer carriage of the double-deck train.

In this way, the fixing of the upper small side top 320 and the inner top of the upper rail train body is realized.

In the implementation, as shown in the FIG. 3, the fixing part 322 has a clamping groove 323 facing an upper large side top;
a side of the upper large side top 310 close to the upper small side top has a clamping part 311;
the upper large side top 310 and the upper small side top 320 are clamped and fixed by the clamping part 311 and the clamping groove 323.

The upper large side top 310 is a large side top of the upper layer carriage of the double-deck train.

In this way, the clamping part and the clamping groove are clamped and fixed to realize the fixed connection between the upper large side top and the upper small side top.

In the implementation, as shown in the FIG. 4, a plurality of second fixing protrusions 312 are arranged along a length direction on the side of the upper large side top 310 close to a center line of the upper layer rail train body.

The second fixing protrusions 312 are fixed with an upper layer air duct.

The upper layer rail train body is the rail train body of the upper layer carriage of the double-deck train, and the upper layer air duct is an air duct of the upper layer carriage of the double-deck train.

In this way, the upper large side top and the upper layer air duct are fixed.

In the implementation, as shown in the FIG. 7 and FIG. 8, an edge of an upper middle roof 330 is provided with a protruding lug 331.

A fourth mounting groove is arranged in the inner top of the upper layer rail train body, the upper middle roof and the inner top of the upper layer rail train body are fixed by the protruding lug 331, the fourth mounting groove, the bolts and the nuts.

The upper middle roof 330 is a middle roof of the upper layer carriage of the double-deck train.

Figure 11:
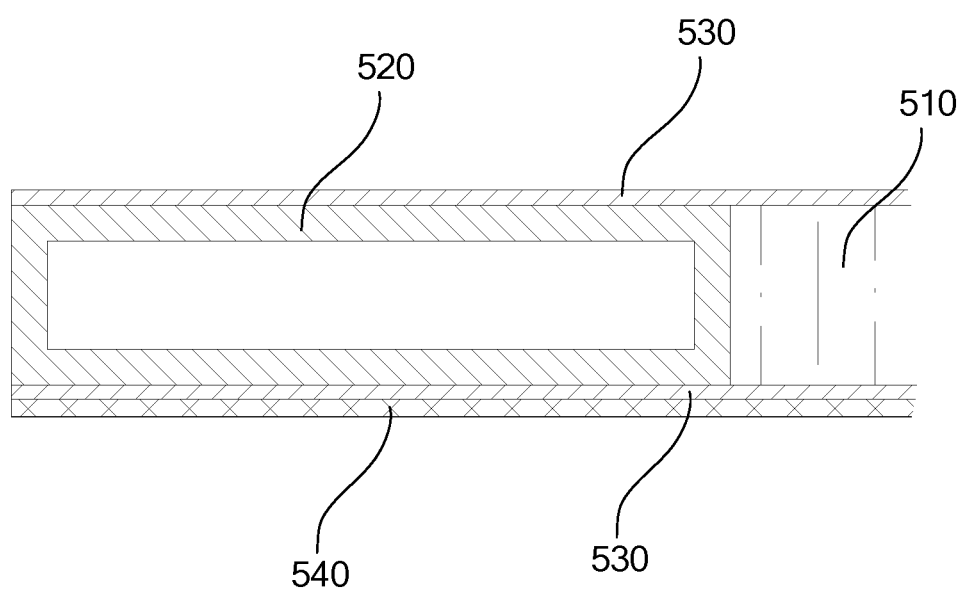
FIG. 11 illustrates a schematic diagram of a middle roof of the rail train according to the embodiment.

FIG. 11 illustrates a schematic diagram of a middle roof of a rail train according to the embodiment. Specifically, as shown in the FIG. 11, a middle of the middle roof is an aluminum honeycomb core board 510, the aluminum honeycomb core board is surrounded by an aluminum profile frame 520, an upper side and a lower side of both of the aluminum honeycomb core board 510 and the aluminum profile frame 520 are respectively fixed with an aluminum plate 530, and the aluminum plate on the lower side is fixed with a facing plate 540.

A thickness of the middle roof is 12.6 mm, a thickness of the aluminum plate is 0.8 mm, and a thickness of the facing plate is 1 mm.

The material selection of the middle roof increases the rigidity of the rail train roof.

In this way, the upper middle roof and the inner roof of the upper rail train body can be conveniently fixed.

In the description of the present disclosure and its embodiment, it is to be understood that the terms "top", "bottom", "height", etc., indicate an orientation or positional relationship based on the orientation or positional relationship shown in the drawings, only for the convenience of describing the present disclosure and simplifying the description, and the terms are not used to indicate or imply that the referred device or element must have a specific orientation, and be constructed and operated in a specific orientation, therefore the terms can not be understood as a limitation of the present disclosure.

In the present disclosure and the embodiments thereof, unless otherwise expressly specified and limited, the terms "arranged", "installation", "conjunction", "connection", "fixed", etc., shall be understood in a broad sense, for example, the term can be a fixed connection, a removable connection, or integrated; the term can be a mechanical connection, an electrical connection, or a communication; the term can be a direct connection, or an indirect connection through an intermediate medium; the term can be a connection within two elements or an interaction between two elements. For those of ordinary skill in the art, the specific meaning of the above term in the present disclosure may be understood according to specific circumstances.

In the present disclosure and embodiment thereof, the first feature "on" or "below" of the second feature can include direct contact of the first and second features, or can include contact of the first and second features not directly but through the contact of further features between them, unless otherwise expressly provided and limit. In addition, the first feature "on", "above" and "up of" of the second feature includes the first feature directly above and obliquely above the second feature, or merely indicate that the first feature is higher in level than the second feature. The first feature "on", "above" and "up of" the second feature includes the first feature directly above and obliquely above the second feature, or merely indicates that the first feature has a horizontal height less than the second feature.

The above disclosure provides many different embodiments or examples for implementing the different structures of the present disclosure. In order to simplify disclosure of the present disclosure, the components and settings of certain examples are described above. Of course, they are merely examples and are not intended to limit the present disclosure. Furthermore, the present disclosure can repeat reference numerals and/or reference letters in different examples, such repetition being for the purpose of simplification and clarity, which does not in itself indicate the relationship between the various embodiments and/or settings discussed. In addition, the present disclosure provides examples of various specific processes and materials, but those of ordinary skill in the art will appreciate the disclosure of other processes and/or the use of other materials.

Although some alternative embodiments of the present disclosure have been described, those skilled in the art may make additional changes and modifications to these embodiments once the basic creative concepts are known. Accordingly, the appended claims are intended to be construed as including alternative embodiments and all variations and modifications falling within the scope of the present disclosure.

It will be apparent to those skilled in the art that various modifications and modifications can be made to the present disclosure without departing from the spirit and scope of the present disclosure. Thus, if these modifications and variations of the present disclosure fall within the scope of the claims of the present disclosure and the equivalent technology thereof, the present disclosure is also intended to include these modifications and variations.

What is claimed is:

1. A rail train, comprising:
a semi-enclosed air duct, and the semi-enclosed air duct comprises an air duct top and an air duct side; the air duct top is fixed with an inner top of a rail train body, the air duct side is connected on both sides of the air duct top and extends downward;
a large side top, and the large side top is fixed to the rail train body as a part of a rail train roof, and the large side top is top-sealed at a bottom of the air duct side to form an air passage with the air duct;
a middle roof, and the middle roof is fixed between a left air duct and a right air duct as a middle part of the rail train roof; and
an L-shaped connecting angle code; a first corner arm of the L-shaped connecting angle code and an inner top of a lower layer rail train body are fixed, a second corner arm of the L-shaped connecting angle code and a side of a lower large side top close to the lower layer rail train body are fixed, so as to top-seal the lower large side top on a bottom of a side of a lower layer air duct;
wherein: a first mounting groove is arranged in an inner top of the lower layer rail train body; the first corner arm of the L-shaped connecting angle code and the inner top of the lower layer rail train body are fixed by the first mounting groove, bolts and nuts; and a plurality of oblong holes are provided along a length direction on a side of the lower large side top close to a side of the rail train body.

2. The rail train according to claim 1, further comprising: a small side top, and the small side top is fixed between the large side top and a side of the rail train as the part of the rail train roof.

3. The rail train according to claim 2,
wherein: the left air duct and the right air duct are two air ducts of a carriage of the rail train.

4. The rail train according to claim 3, wherein: the large side top comprises a left large side top and a right large side top, and the left large side top and the right large side top are two symmetrical structures; the left large side top is top-sealed at a bottom of a left air duct side, and the right large side top is top-sealed at a bottom of a right side of the air duct side; and
the small side top comprises a left small side top and a right small side top, and the left small side top and the right small side top are the two symmetrical structures, the left small side top is fixed between the left large side top and a left side part of the rail train, and the right small side top is fixed between the right large side top and a right side part of the rail train.

5. The rail train according to claim 3,
wherein: the lower layer rail train body is a body of a lower layer carriage of a double-deck train, the lower large side top is a large side top of the lower layer carriage of the double-deck train, the lower layer air duct is an air duct of the lower layer carriage of the double-deck train.

6. The rail train according to claim 5, wherein
the second corner arm of the L-shaped connecting angle code and the side of the lower large side top close to the lower layer rail train body are fixed by the oblong holes, bolts and nuts.

7. The rail train according to claim 6, wherein: a plurality of first fixing protrusions are provided along the length direction on the side of the lower large side top close to a center line of the lower layer rail train body; and
the first fixing protrusions are fixed with the lower layer air duct.

8. The rail train according to claim 5, wherein: a V-shaped fixing part is fixed on an inner side of a lower small side top, an arm of the V-shaped fixing part is fixed with the inner side of the lower small side top; an other arm of the V-shaped fixing part is fixed with a lamp profile of a lower layer carriage of the rail train;
wherein: the lower small side top is a small side top of the lower layer carriage of the double-deck train.

9. The rail train according to claim 8, wherein: an inner side of the lower small side top near the side of the lower large side top is provided with a buckle;
an inner side of the lower large side top close to a side of the lower small side top is provided with a buckle groove; and
the buckle and the buckle groove are engaged to connect the lower small side top and the lower large side top.

10. The rail train according to claim 9, wherein: an inner edge of a lower middle roof is provided with an upward convex bending part;

the inner top of the lower layer rail train body is provided with a second mounting groove, the lower middle roof and the inner top of the lower layer rail train body are fixed by the upward convex bending part, the second mounting groove, bolts and nuts;

wherein: the lower middle roof is a middle roof of the lower layer carriage of the double-deck train.

11. The rail train according to claim 3, wherein: an upper small side top comprises a vertical part and a fixing part connected to an upper end of the vertical part, and a lower side of the vertical part is fixed to a luggage rack of the rail train;
 a third mounting groove is arranged in an inner top of an upper layer rail train body, the upper small side top and the inner top of the upper layer rail train body are fixed by the fixing part, the third mounting groove, bolts and nuts;
 wherein: the upper small side top is a small side top of an upper layer carriage of a double-deck train, and the upper layer rail train body is a rail train body of the upper layer carriage of the double-deck train.

12. The rail train according to claim 11, wherein: the fixing part has a clamping groove facing an upper large side top;
 a side of the upper large side top close to the upper small side top has a clamping part; and
 the upper large side top and the upper small side top are clamped and fixed by the clamping part and the clamping groove;
 wherein: the upper large side top is a large side top of the upper layer carriage of the double-deck train.

13. The rail train according to claim 12, wherein: a plurality of second fixing protrusions are arranged along a length direction on the side of the upper large side top close to a center line of the upper layer rail train body;
 the second fixing protrusions are fixed with an upper layer air duct;

wherein: the upper layer rail train body is the rail train body of the upper layer carriage of the double-deck train, and the upper layer air duct is an air duct of the upper layer carriage of the double-deck train.

14. The rail train according to claim 11, wherein: an edge of an upper middle roof is provided with a protruding lug;
 a fourth mounting groove is arranged in the inner top of the upper layer rail train body, the upper middle roof and the inner top of the upper layer rail train body are fixed by the protruding lug, the fourth another mounting groove, bolts and nuts;
 wherein: the upper middle roof is a middle roof of the upper layer carriage of the double-deck train.

15. The rail train according to claim 1, further comprising: a sealing strip, and the sealing strip is fixed at the bottom of the air duct side; an interference fit is adopted between the sealing strip and the large side top for a fixing connection.

16. The rail train according to claim 1, further comprising: a cold-proof layer, and the cold-proof layer is fixed on a side of the large side top toward the air duct.

17. The rail train according to claim 1, wherein: the large side top is a large side top made of 4 mm fiber glass-reinforced plastics, and a small side top is a small side top made of the 4 mm fiber glass-reinforced plastics.

18. The rail train according to claim 1, wherein: a middle of the middle roof is an aluminum honeycomb core board, the aluminum honeycomb core board is surrounded by an aluminum profile frame, an upper side and a lower side of both of the aluminum honeycomb core board and the aluminum profile frame are respectively fixed with an aluminum plate, and the aluminum plate on the lower side is fixed with a facing plate;
 wherein: a thickness of the middle roof is 12.6 mm, a thickness of the aluminum plate is 0.8 mm, and a thickness of the facing plate is 1 mm.

* * * * *